US009338666B2

(12) United States Patent
Bathiche et al.

(10) Patent No.: US 9,338,666 B2
(45) Date of Patent: *May 10, 2016

(54) BINDING OF AN APPARATUS TO A COMPUTING DEVICE (71) Applicant: Microsoft Technology Licensing, LLC, Redmond, WA (US)

(72) Inventors: Steven Nabil Bathiche, Kirkland, WA (US); Christopher A. Whitman, Fort Collins, CO (US); Yann Florian Daniel Riche, Seattle, WA (US); Sarah Graham Williams, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,127

(22) Filed: Aug. 5, 2015

(65) Prior Publication Data

US 2015/0341801 A1    Nov. 26, 2015

Related U.S. Application Data (63) Continuation of application No. 14/104,668, filed on Dec. 12, 2013, now Pat. No. 9,232,409.

(51) Int. Cl.
G06F 3/06 (2006.01)
H04W 24/00 (2009.01)
(Continued)

(52) U.S. Cl.
CPC .............. *H04W 24/00* (2013.01); *G06F 3/038* (2013.01); *G06F 3/03545* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS 6,897,854 B2  5/2005  Keely et al.
8,446,359 B2  5/2013  Doczy et al.
(Continued)

FOREIGN PATENT DOCUMENTS

EP          1659481         5/2006
WO     WO-2013048533       4/2013

OTHER PUBLICATIONS

"Notice of Allowance", U.S. Appl. No. 14/104,668, Apr. 13, 2015, 6 pages.

(Continued)

*Primary Examiner* — Scott Sun
(74) *Attorney, Agent, or Firm* — Qudus Olaniran; Judy Yee; Micky Minhas (57) ABSTRACT Binding techniques are described that are configured to bind an apparatus for operation with a computing device. A computing device may include one or more object detection sensors that are configured to detect proximity of an object, a wireless communication module configured to support wireless communication, and one or more modules implemented at least partially in hardware. The one or more modules are configured to perform operations that include recognizing a first event as involving detection of proximity of an apparatus by the one or more object detection sensors, recognizing a second event as involving receipt of a wireless communication by the wireless communication module from the apparatus, and responsive to the recognizing of the first and second events, causing the apparatus to be bound for operation with the computing device such that the apparatus is configured to initiate one or more host side commands of the computing device.

20 Claims, 6 Drawing Sheets (51) Int. Cl.
  *G06F 11/30* (2006.01)
  *G06F 3/044* (2006.01)
  *G06F 3/041* (2006.01)
  *G06F 3/038* (2013.01)
  *G06F 13/12* (2006.01)
  *H04W 76/02* (2009.01)
  *G06F 3/0354* (2013.01)
  *G06F 13/38* (2006.01)

(52) U.S. Cl.
  CPC .......... *G06F 3/0416* (2013.01); *G06F 11/3089* (2013.01); *G06F 13/122* (2013.01); *H04W 76/023* (2013.01); *G06F 2203/04101* (2013.01)

(56) References Cited

U.S. PATENT DOCUMENTS

| | | | |
|---|---|---|---|
| 9,232,409 | B2 | 1/2016 | Bathiche et al. |
| 2005/0024346 | A1 | 2/2005 | Dupraz et al. |
| 2006/0087497 | A1 | 4/2006 | Borgaonkar et al. |
| 2007/0126716 | A1 | 6/2007 | Haverly |
| 2007/0188480 | A1 | 8/2007 | Teng et al. |
| 2008/0198146 | A1 | 8/2008 | Bryborn et al. |
| 2012/0223883 | A1 | 9/2012 | Solomon |
| 2013/0309971 | A1* | 1/2013 | Kiukkonen .......... H04L 63/107 455/41.2 |
| 2013/0171939 | A1 | 7/2013 | Tian et al. |
| 2015/0172932 | A1 | 6/2015 | Bathiche et al. |

OTHER PUBLICATIONS

"Notice of Allowance", U.S. Appl. No. 14/104,668, Aug. 14, 2015, 6 pages.

"International Search Report and Written Opinion", Application No. PCT/US2014/066993, Apr. 13, 2015, 22 Pages.

"Bluetooth Specification, Covered Core Package", Version 4.1, Bluetooth SIG, vol. 2, No. Part H, Dec. 3, 2013, 22 pages.

"Bluetooth Secure Simple Pairing Using NFC", Application Document NFC Forum, Oct. 18, 2011, 32 pages.

"Second Written Opinion", Application No. PCT/US2014/066993, Sep. 22, 2015, 9 pages.

"International Preliminary Report on Patentability", Application No. PCT/US2014/066993, Jan. 19, 2016, 9 pages.

* cited by examiner

BINDING OF AN APPARATUS TO A COMPUTING DEVICE

RELATED APPLICATIONS

This application claims priority as a continuation of U.S. patent application Ser. No. 14/104,668, filed Dec. 12, 2013, and titled "Binding of an Apparatus to a Computing Device," the entire disclosure of which is hereby incorporated by reference.

BACKGROUND

A variety of different types of apparatus may be utilized to expand the functionality of a computing device. For example, peripheral devices may be utilized to expand storage, act as input devices, output devices, and so on. Thus, these devices may be utilized as an integral part of a user's interaction with the computing device.

Additionally, as the variety of computing devices has expanded, so too has the variety of different types of apparatus that may be utilized to support interaction with computing devices. As such, a user may have access to a wide range of computing devices in a typical day. However, conventional techniques that were utilized to bind the apparatus for operation in conjunction with the computing device could be cumbersome, unwieldy, and involve a multitude of manual steps. Consequently, users often choose to forgo this functionality provided by the apparatus.

SUMMARY

Binding techniques configured to bind an apparatus for operation with a computing device are described. In one or more implementations, a computing device includes one or more object detection sensors that are configured to detect proximity of an object, a wireless communication module configured to support wireless communication, and one or more modules implemented at least partially in hardware. The one or more modules are configured to perform operations that include recognizing a first event as involving detection of proximity of an apparatus by the one or more object detection sensors, recognizing a second event as involving receipt of a wireless communication by the wireless communication module from the apparatus, and responsive to the recognizing of the first and second events, causing the apparatus to be bound for operation with the computing device such that the apparatus is configured to initiate one or more host side commands of the computing device.

In one or more implementations, an apparatus includes an identifier module including a first identifier that is configured to be recognized through detection of proximity to one or more object detection sensors of a computing device. The apparatus also includes a wireless communication module that is configured to form a wireless communication for communication to the computing device that includes a second identifier, the first and second identifiers being configured for comparison by the computing device to cause binding of the apparatus with the computing device such that the apparatus is configured to initiate one or more host side commands of the computing device. The apparatus also includes a mechanical actuator that is selectable by a user to cause the communication of the second identifier by the wireless communication module.

In one or more implementations, a first event is recognized as involving detection of proximity of an apparatus by the one or more object detection sensors. A second event is recognized as involving receipt of a wireless communication by the wireless communication module from the apparatus. Responsive to the recognition of the first and second events as occurring within a predefined amount of time, the apparatus is caused to be bound for operation with an operating system of a computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Computing devices may employ a wide range of types of apparatus to support different types of user interaction with the device. This may include input devices that are configured to be used in addition to the computing device, an example of which is a stylus, cursor control device, and so on. However, conventional techniques that were utilized to bind operation of the apparatus to the computing device often involved a plurality of steps that include manual interaction with a user interface on the part of a user, processing by an operating system of the computing device, and so on.

Apparatus binding techniques are described herein. In one or more implementations, binding techniques are described that may be utilized to bind an apparatus for operation with a computing device without interaction with a user interface output by the computing device. Further, initiation of the binding operation may be caused separately without involvement by an operating system of the computing device, thereby conserving device resources. A variety of different techniques may be utilized to perform this binding.

For example, recognition of a plurality of events may be leveraged to cause apparatus binding. A stylus, for instance, may include a digitizer that is recognized by a computing device, such as an "eraser" end of the stylus that mimics a pen/pencil configuration. The eraser may be tapped against a display device of the computing device, which causes the computing device to recognize an identifier stored as part of the digitizer such that the computing device may recognize that an eraser is being used. Thus, this may be recognized as a first event by the computing device.

A second event may also be recognized by the computing device. Continuing with the previous instance, the stylus may also include a mechanical actuator such that a user may "click" the stylus, e.g., the eraser end of the stylus that mimics a mechanical pencil/retractable pen. This may cause the stylus to send a wireless communication (e.g., via a radio frequency module) that includes an identifier to the computing device. The computing device may then compare the two identifiers received via the first and second events to determine whether to permit binding of the stylus to the computing device. If so, the operating system may be caused to perform the binding such that the stylus is configured to evoke one or more host side commands of the computing device, e.g., as part of the operating system, applications, or other software. Thus, in this example the recognition and causing of the binding may be performed by firmware or other modules of the computing device apart from the operating system. Further discussion of this and other examples may be found in relation to the following figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
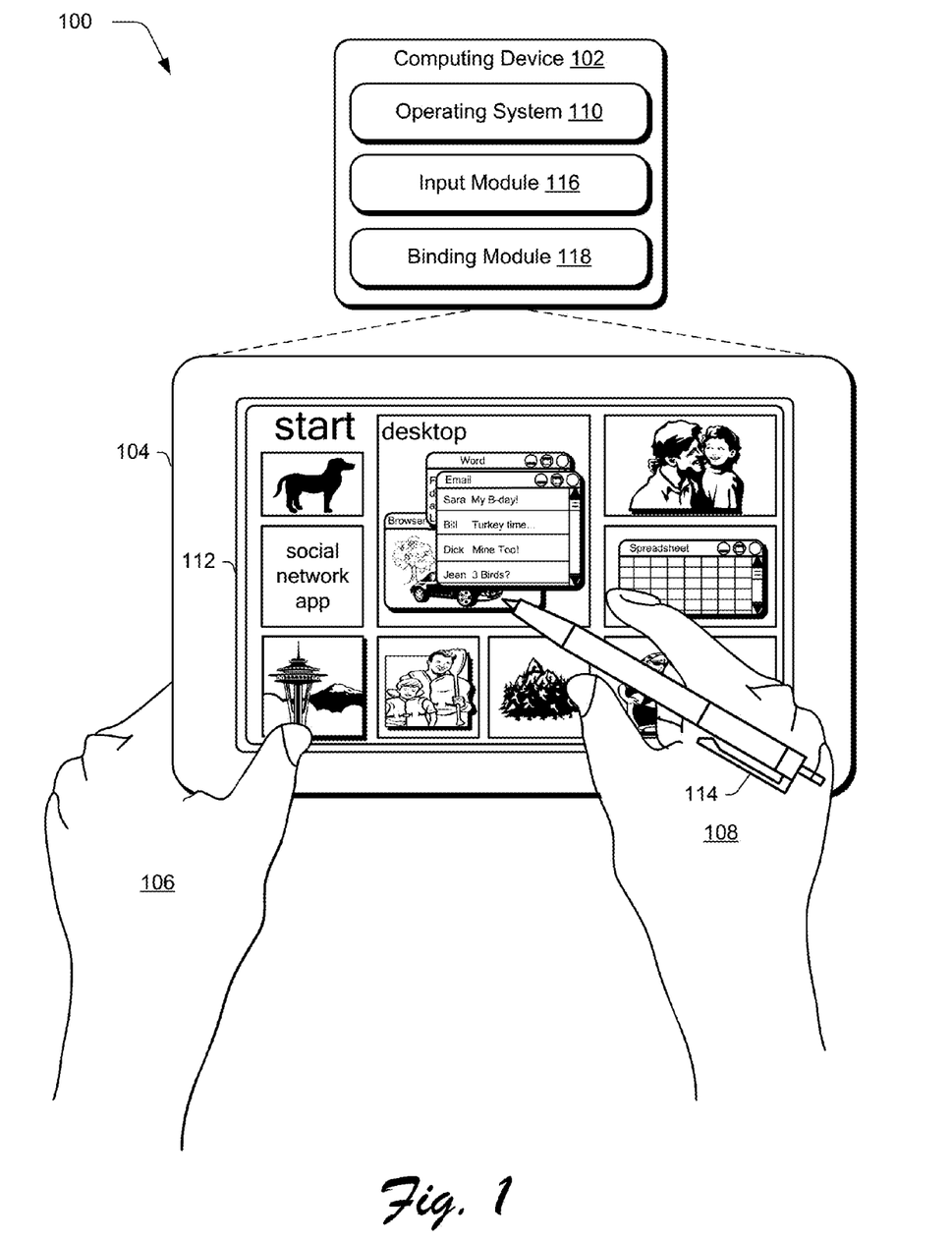
FIG. 1 is an illustration of an environment in an example implementation that is operable to employ the techniques described herein to secure a peripheral device.

FIG. 1 is an illustration of an environment 100 in an example implementation that is operable to employ techniques described herein. The illustrated environment 100 includes a computing device 102. The computing device 102 may be configured in a variety of ways. For example, a computing device may be configured as a computer that is capable of communicating over a network, such as a desktop computer, an entertainment appliance, a set-top box communicatively coupled to a display device, a game console, and so forth. The computing device 102 may also be configured as a mobile communications device, such as to include a housing 104 that is configured to be held by one or more hands 106, 108 of a user. For example, a mobile communications device may be configured as a mobile phone, a slate (e.g., tablet), portable music device, portable gaming device, and so on.

Thus, the computing device 102 may range from full resource devices with substantial memory and processor resources (e.g., personal computers, game consoles) to a low-resource device with limited memory and/or processing resources (e.g., traditional set-top boxes, hand-held music devices). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on. Further discussion of different configurations that may be assumed by the computing device may be found in relation to FIG. 6.

The computing device 102 is further illustrated as including an operating system 110. The operating system 110 is configured to abstract underlying functionality of the computing device 102 to applications or other software that are executable on the computing device 102. For example, the operating system 110 may abstract the processing system, memory, network, and/or display device 112 functionality of the computing device 102 such that the applications may be written without knowing "how" this underlying functionality is implemented. The application, for instance, may provide data to the operating system 110 to be rendered and displayed by the display device 112 without understanding how this rendering will be performed. Likewise, the operating system 110 may abstract touchscreen functionality of the display device 112 for use by the application. The operating system 108 may also represent a variety of other functionality, such as to manage a file system and user interface that is navigable by a user of the computing device 102.

The computing device 102 may support a variety of different interactions. For example, the computing device 102 may include one or more hardware devices that are manipulable by a user to interact with the device. Examples of such devices include peripheral devices such as a keyboard, cursor control device (e.g., mouse), a stylus 114, and so on.

In the illustrated example, first and second hands 106, 108 of a user are shown. The first hand 106 of the user is shown as holding a housing 104 of the computing device 102. The second hand 108 of the user is illustrated as providing one or more inputs using the stylus 114 that are detected using an input module 116.

The input module 116, for instance, may support touchscreen functionality of the display device 112 to perform an operation, such as to launch an application, draw on the display device 112, perform gestures, and so on. Thus, recognition of the inputs may be leveraged to interact with a user interface output by the computing device 102, such as to interact with a game, an application, browse the internet, change one or more settings of the computing device 102, and so forth. Although a stylus 114 is shown, a variety of other types of apparatus are also contemplated that may support interaction with the computing device 102, such as a mouse or other cursor control device, output device, input device such as a keyboard or camera, and so on.

The computing device 102 is also illustrated as including a binding module 118. The binding module 118 is representative of functionality to bind an apparatus for operation in conjunction with the computing device 102, an example of which is illustrated as the stylus 114 in the figure. For example, an apparatus may be configured to initiate a host side command of the computing device 102 via one or more inputs that are detected by the computing device 102. The computing device 102, however, may not be configured to recognize the inputs unless the apparatus is bound to the device. This may be configured for a variety of reasons, such as to protect against inadvertent inputs or outputs, enforce security protocols, and so on. As previously described, however, conventional techniques utilized to perform such a binding were often complex, involved user interaction with a user interface, and so on and thus could detract from a user's overall experience with the computing device 102.

Accordingly, the biding module 118 may be configured to bind operation of the apparatus (e.g., stylus 114 in this example) with the computing device 102 in an efficient and intuitive manner. Thus, this binding may support seamless use of the apparatus with a variety of different computing devices in an efficient manner. Binding may be performed in a variety of ways, such as through recognition of events as further described in relation to the following discussion and corresponding figure. Further, binding may be initiated apart from the operating system 110 to conserve resources, e.g., such that the events may be recognized before involvement in the operating system 110 as further described below.

Figure 2:
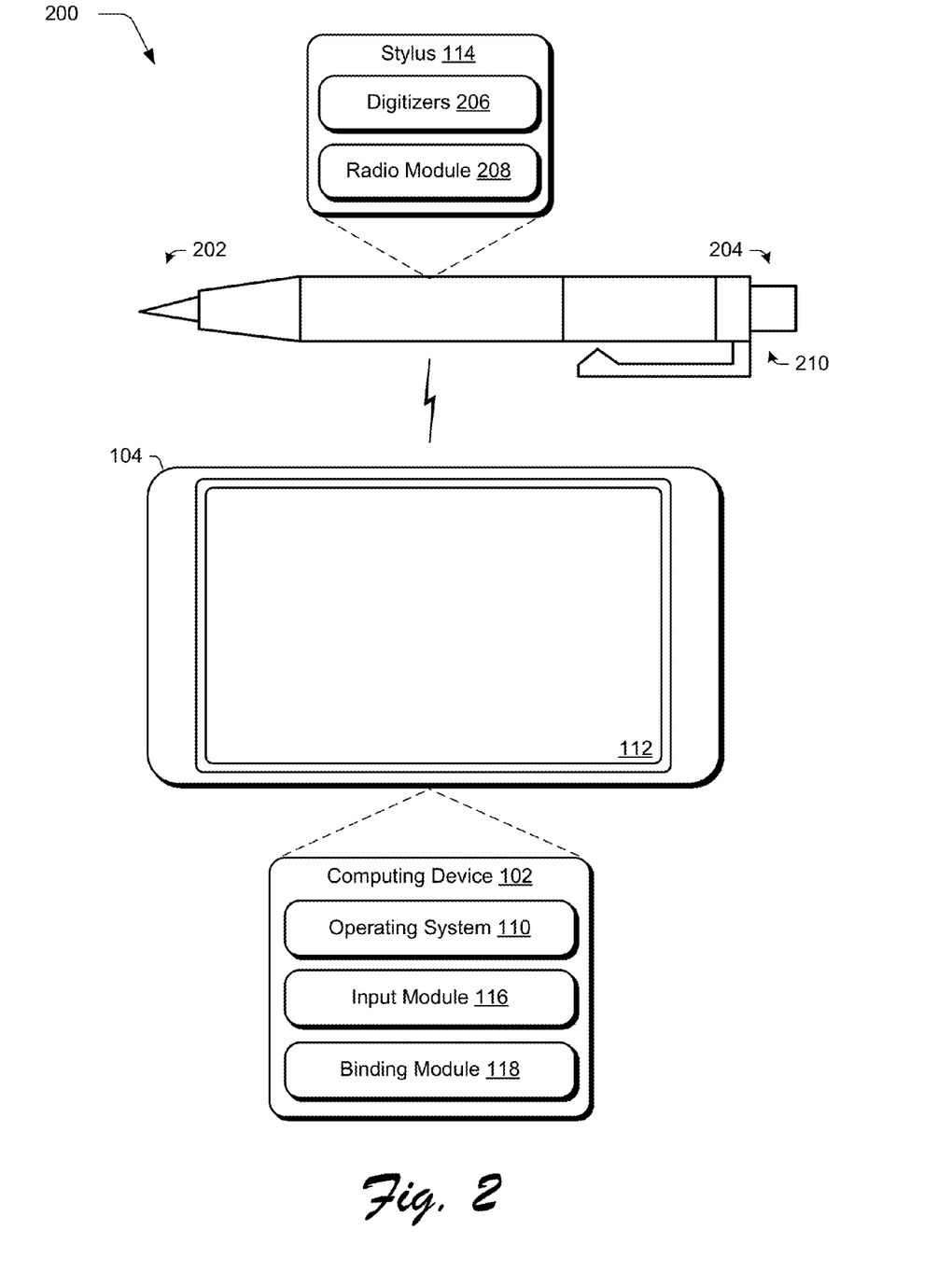
FIG. 2 depicts a system in an example implementation in which an apparatus configured as a stylus is configured to initiate one or more host side commands via binding with a computing device.

FIG. 2 depicts a system 200 in an example implementation in which an apparatus configured as a stylus is configured to initiate one or more host side commands via binding with a computing device. The computing device 102 includes an operating system 110, input module 116, and binding module 118 as before that are contained within a housing 104 that assumes a mobile configuration.

An example of an apparatus is illustrated as a stylus 114 in this example that is configured to support interaction with the computing device 102. For example, a housing of the stylus 114 in this example is configured to mimic a retractable pen or mechanical pencil. As such, the stylus 202 may include a first and second ends 202, 204 that are configured to support different operations in conjunction with the computing device 102. For example, the first end 202 may be configured to write on the display device 112 and a second end 204 may be configured to act as an eraser to erase the writing or other portions of a user interface output by the display device 112 of the computing device 102.

To recognize the different ends of the stylus 114, different digitizers 206 may be disposed at corresponding ends such that an input module 116 may detect which end of the stylus 114 is disposed proximal to touchscreen functionality of the input module 116 of the computing device 102. In other words, the stylus 114 may be configured to approximate two different pens having different functionality which is detected through the digitizers 206 of the stylus 114.

The stylus 114 may also be configured to initiate a host side command at a range that is greater than that which may be detected using the digitizers 206. The stylus 114, for instance, may include a radio device 208 having a range to permit initiation of the host side command from three to four feet away. The stylus 114 may include a mechanical actuator 210 (e.g., a switch) that is selectable by a user. Selection (e.g., pressing) of the mechanical actuator 210 may cause the radio device 208 to generate a signal having an identifier that is usable to cause the computing device 102 to perform a host side command, e.g., an operation by the operating system 110, applications, and so on. A variety of different types of host side commands may be initiated, such as a "next slide" command for a presentation, to navigate back through a browser, navigate within and/or between applications in a user interface output by the display device 112, and so forth.

To manage whether the host side command is able to be initiated by the stylus 114, a binding techniques may be utilized such that the computing device 102 may manage which apparatuses are able to interact with the device. A variety of different techniques may be utilized to perform this binding, such as to recognize a plurality of events that are indicative of an apparatus that is to be bound to the computing device 102, an example of which is described as follows and shown in the corresponding figure.

Figure 3:
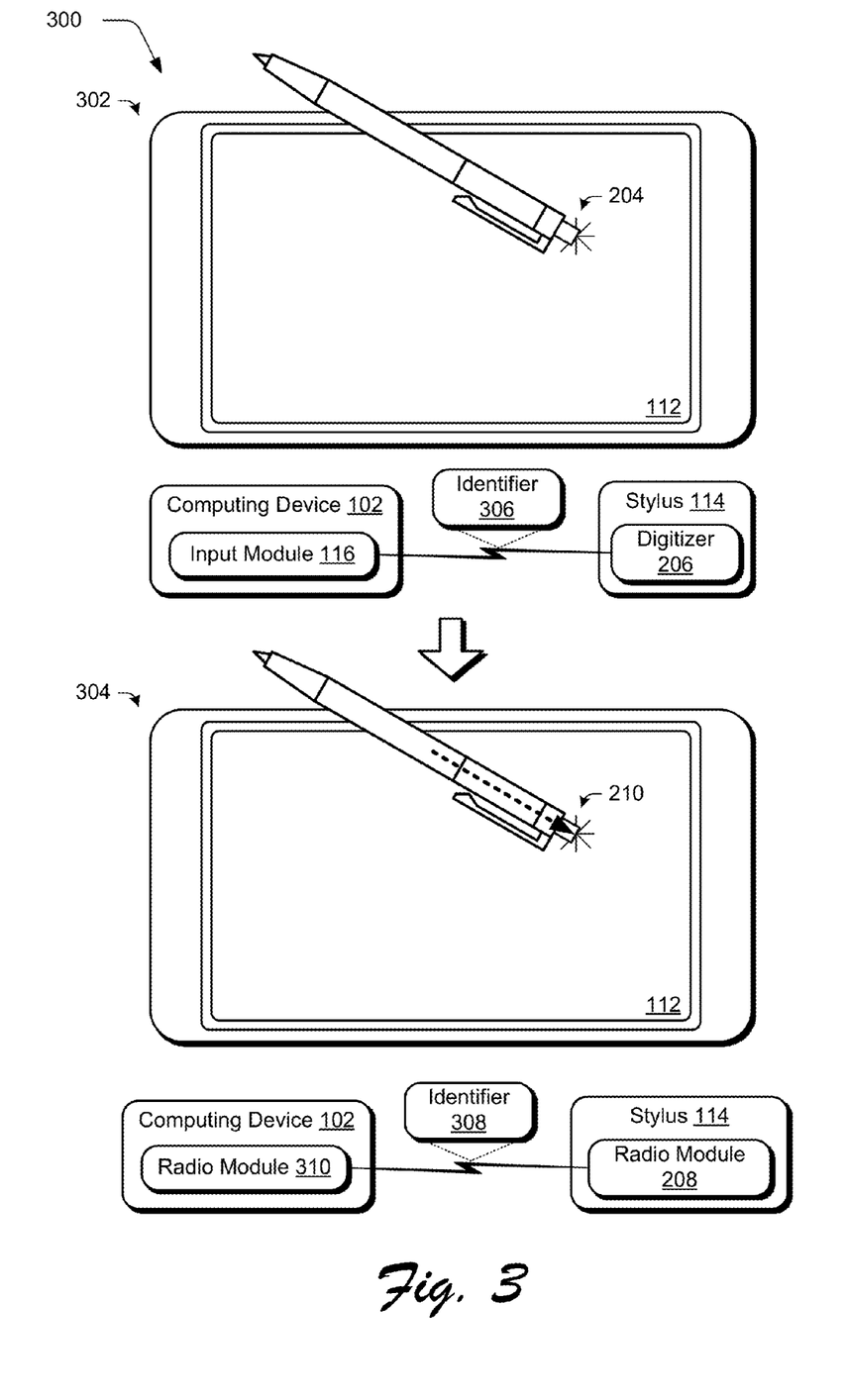
FIG. 3 depicts a system in an example implementation in which the stylus of FIG. 2 is bound to a computing device to permit evocation of host side commands.

FIG. 3 depicts a system 300 in an example implementation in which the stylus 114 of FIG. 2 is bound to a computing device 102 to permit initiation of host side commands. The system 300 is illustrated through use of first and second stages 302, 304. At the first stage 302, performance of a first event is shown. In this example, a second end 204 of the stylus 114 is disposed proximal to a display device 112 of the computing device 102, e.g., tapped against. This causes the input module 116 of the computing device 102 to recognize an identifier 306 associated with the digitizer 206, e.g., which is used to determine "which end of the pen" is being used, identify the stylus 114 itself, and so on.

In one or more implementations, the input module 116 responds to the recognition of the identifier 306 to "listen" for performance of the second event. In this way, resources of the computing device may be conserved (e.g., power consumption, processing, and so on) until the first event has been recognized. Further, the computing device 102 may be configured to "look" for a particular identifier as described below.

At the second stage 304, performance of an example of a second event is shown. In this example, a mechanical actuator 210 of the stylus 114 is "clicked." Continuing with the previous example, for instance, the second end 204 of the stylus 114 may be placed proximal to the display device 112 for performance of the first event as shown in the first stage 302. This motion may then continue to perform the second event by pressing the mechanical actuator 210 of the stylus 114 against the display device 112, which is shown through use of an arrow in the second stage 304.

The pressing of the mechanical actuator 210 causes the radio module 208 of the stylus 114 to communicate (e.g., broadcast) an identifier 308 for received by a radio module 310 of the computing device 102. As previously described, the radio module 310 may be configured to "listen" for the identifier 308 due to receipt of the identifier 306 as part of the first event of the first stage 302. Thus, in this example the first stage 302 depicts a first event that communicates an identifier 306 via the digitizer 206 and a second event depicted in the second stage 304 that communicates another identifier 308 via a radio module 208.

Both of these events may then be recognized by the binding module 118 and in response to successful comparison of the identifiers 306, 308 bind operation of the stylus 114 with the computing device 102. For example, subsequent actuations of the mechanical actuator may be utilized to initiate host side commands of the computing device 102 as previously described. Thus in this example the digitizers 206 may be configured to work with the computing device 102 without binding whereas the radio module 208 involves binding to initiate the host side commands. A variety of other examples are also contemplated without departing from the spirit and scope thereof, such as to make use of a predefined amount of time to perform the binding.

Figure 4:
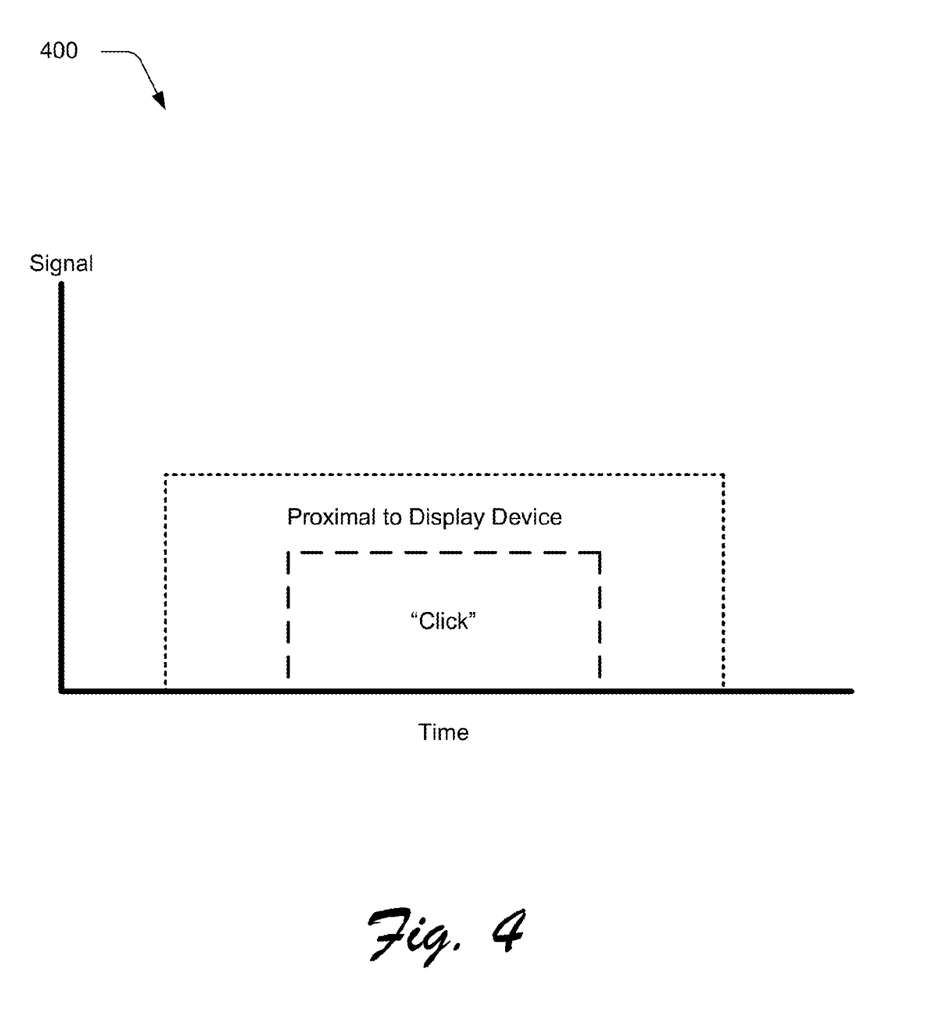
FIG. 4 depicts a graph in an example implementation showing overlapping temporal windows in which the first and second events are to occur to cause binding of an apparatus.

FIG. 4 depicts a graph 400 in an example implementation showing overlapping temporal windows in which the first and second events are to occur to cause binding of an apparatus. A first temporal window is shown that corresponds to a first event, such as detecting the object as proximal to a display device as described in the previous figure.

As previously described, this may cause the computing device to "listen" for an identifier for a predetermined amount of time, which is illustrated as a "click" temporal window in the figure although it should be readily apparent that a wide variety of other events are also contemplated. In this way, the binding module 118 may protect against false positives which may further be improved by "listening" for a particular identifier as previously described. Continuing with the previous example, the digitizer 206 of the second end (or associated with the stylus itself) may communicate the identifier 306 and the radio module 208 of the stylus 114 may communicate the other identifier 308 in response to "clicking" of the mechanical actuator 210. These identifiers may then be compared and if a determination is made that the identifiers correspond to each other, the stylus 114 and more particularly the radio module 208 of the stylus 114 is this example may be bound to the computing device 102.

Although a radio module was described, it should be readily apparent that a wide variety of other types of wireless communication (e.g., audio, infrared, camera, audio, and so forth that may be detected using corresponding sensors) are also contemplated without departing from the spirit and scope thereof. As previously described, the apparatus may assume a wide variety of configurations other than a stylus 114 for binding with the computing device 102 using the described techniques, such as a headset, cursor control device, input device, output device, another computing device (e.g., a mobile communications device such as a mobile phone), and so on.

Example Procedures

The following discussion describes apparatus binding techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the previous figures.

Figure 5:
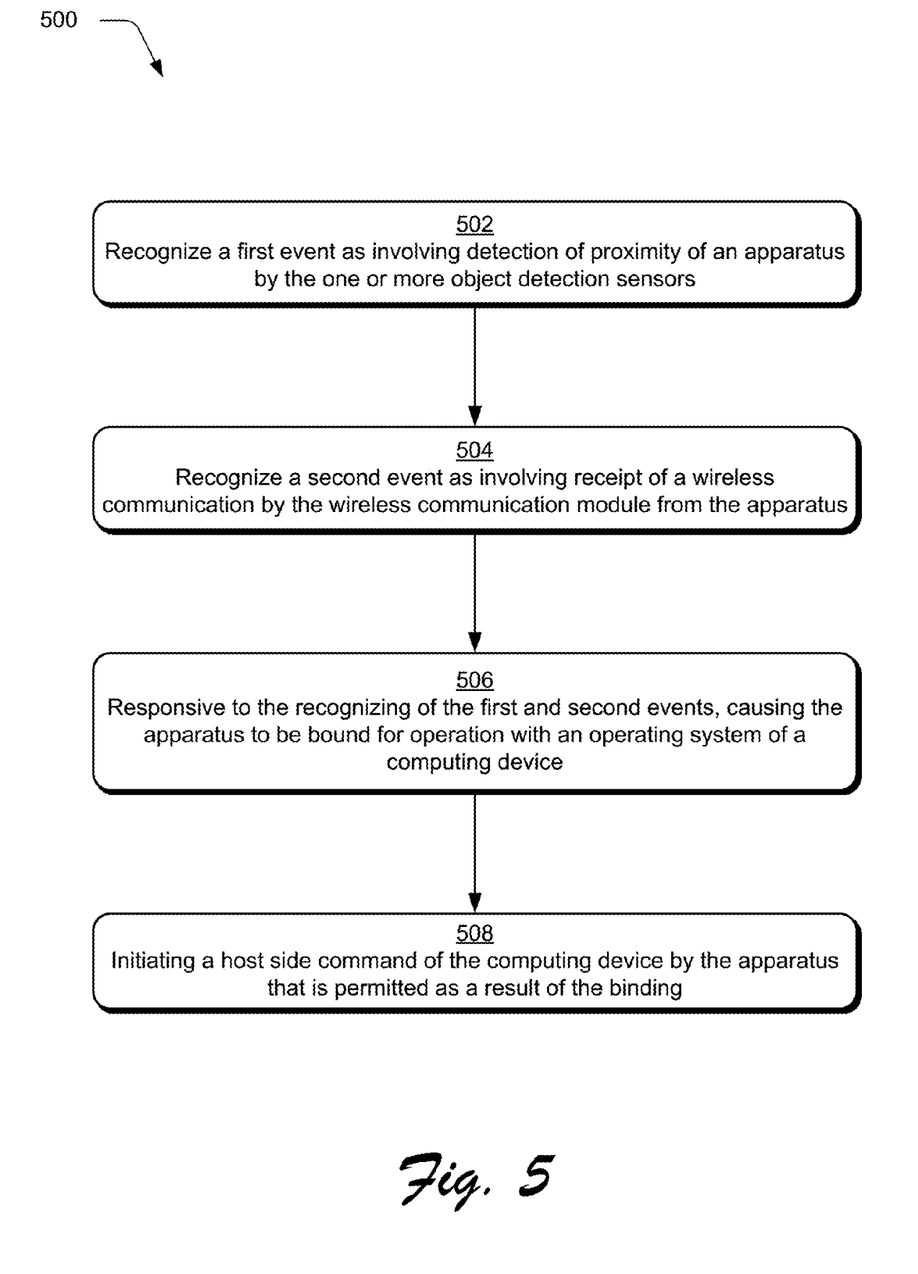
FIG. 5 depicts a procedure in an example implementation in which recognition of a plurality of events is used as a basis to cause an apparatus to be bound for operation in conjunction with a computing device.

FIG. 5 depicts a procedure 500 in an example implementation in which recognition of a plurality of events is used as a basis to cause an apparatus to be bound for operation in conjunction with a computing device. A first event is recognized as involving detection of proximity of an apparatus by the one or more object detection sensors (block 502). The first event may be detected in a variety of different ways, such as through touchscreen functionality of a display device 112 of the computing device 102, a spoken command, gesture, captured through use of a natural user interface by a camera that does not involve touch, and so forth.

A second event is recognized as involving receipt of a wireless communication by the wireless communication module from the apparatus (block 504). The second event may be detected in the same or different manner that the first event, e.g., using different sensors, communication channel types, and so forth.

Responsive to the recognition of the first and second events, the apparatus is caused to be bound for operation with an operating system of a computing device (block 506). As previously described, this may include matching identifiers, recognition of the events themselves without the identifiers, use of temporal windows of predefined amounts to time, and so on.

A host side command of the computing device is initiated by the apparatus that is permitted as a result of the binding (block 508). The host side command, for instance, may involve a particular communication channel that was bound, such as a radio frequency channel as described above as opposed to use of the digitizer. Additionally, a variety of different types of host side commands may be initiated, such as operating system commands, application commands, hardware specific commands, and so forth as previously described.

Example System and Device

Figure 6:
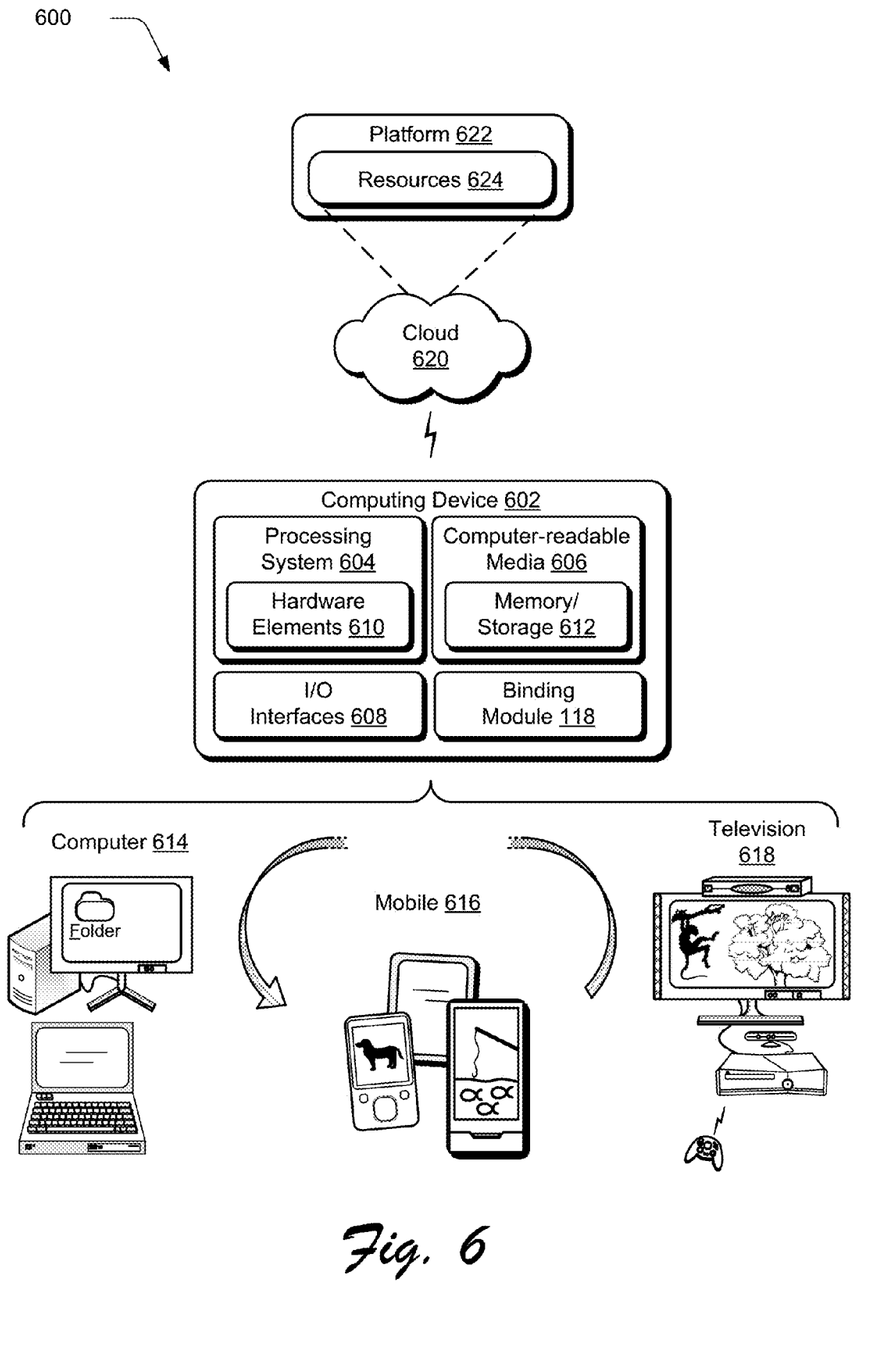
FIG. 6 illustrates an example system including various components of an example device that can be implemented as any type of computing device as described with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways to support user interaction.

The computing device 602 is further illustrated as being physically coupled to a peripheral device 614 that is physically removable from the computing device 602, e.g., using magnetism. In this way, a variety of different input devices may be coupled to the computing device 602 having a wide variety of configurations to support a wide variety of functionality.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
   one or more object detection sensors that are configured to detect proximity of an object; and
   wireless communication circuitry configured to support wireless communication; wherein the computing device is configured to:
      recognize a first event as involving detection of proximity of an apparatus by the one or more object detection sensors;
      recognize a second event as involving receipt of a wireless communication from the apparatus; and
      responsive to the recognizing of the first and second events, causing the apparatus to be bound for operation with the computing device such that the apparatus is configured to initiate one or more host side commands of the computing device.

2. A computing device as described in claim 1, wherein the binding is not performed if either of the first or second events are not recognized.

3. A computing device as described in claim 1, wherein the recognizing of the first and second events and the causing is performed without involvement of an operating system of the computing device that is responsible for file management of the computing device.

4. A computing device as described in claim 3, further comprising binding the apparatus by the operating system responsive to receipt of an input generated as part of the causing the apparatus to be bound.

5. A computing device as described in claim 1, wherein the recognizing of the first and second events and the causing the apparatus to be bound is performed automatically and without user intervention.

6. A computing device as described in claim 1, wherein the causing the apparatus to be bound is performed automatically and without user intervention such that a user interface is not output, via which a user is to interact to cause the apparatus to be bound to the computing device.

7. A computing device as described in claim 1, wherein the one or more object detection sensors are configured to support touchscreen functionality of a display device.

8. A computing device as described in claim 1, wherein the wireless communication circuitry comprises one or more radio frequency sensors configured to detect a radio communication, infrared sensors configured to detect infrared communication, audio sensors, or image sensors configured to capture one or more images.

9. A computing device as described in claim 1, wherein the causing the apparatus to be bound is performed responsive to a determination that the first and second events occur within a predefined amount of time.

10. A computing device as described in claim 1, wherein the causing the apparatus to be bound is performed responsive to a determination that an identification received as part of the first event corresponds with an identifier received as part of the second event.

11. A computing device as described in claim 1, wherein the second event is initiated by the user by pressing a button of the apparatus.

12. An apparatus comprising:
  identifier circuitry configured to communicate a first identifier in response to a computing device detecting proximity of the apparatus to one or more object detection sensors; and
  wireless communication circuitry configured to send a wireless communication to the computing device that includes a second identifier in response to selection of a button on the apparatus, wherein a successful comparison of the first and second identifiers causes the apparatus to perform a binding operation with the computing device such that the apparatus is configured to initiate one or more host side commands of the computing device.

13. An apparatus as described in claim 12, further comprising a housing that is configured to be held by one or more hands of a user.

14. An apparatus as described in claim 13, wherein the housing is configured as a stylus.

15. An apparatus as described in claim 14, wherein the button is included on a housing of the stylus.

16. An apparatus as described in claim 12, wherein the identifier circuitry is configured as part of a digitizer.

17. A method performed by a computing device comprising:
  recognizing a first event as involving detection of proximity of an apparatus by one or more object detection sensors configured to support touchscreen functionality;
  recognizing a second event as involving receipt of a wireless communication from the apparatus; and
  responsive to the recognizing of the first and second events as occurring within a predefined amount of time, causing the apparatus to be bound for operation with an operating system of the computing device.

18. A method as described in claim 17, wherein the recognizing of the first and second events and the causing the apparatus to be bound are performed independent of the operating system.

19. A method as described in claim 17, wherein the one or more object detection sensors are configured as part of the touchscreen functionality of a display device.

20. A method as described in claim 17, wherein the wireless communication is sent from the apparatus responsive to actuation of a button of the apparatus.

* * * * *